Dec. 10, 1968  J. A. MARTIN ETAL  3,414,916
AMPHIBIOUS CAMPER APPARATUS

Filed Nov. 29, 1967  3 Sheets-Sheet 1

INVENTORS
JAMES A. MARTIN &
BY ALBERT D. DeLOZIER
Dunlap and Laney
ATTORNEYS

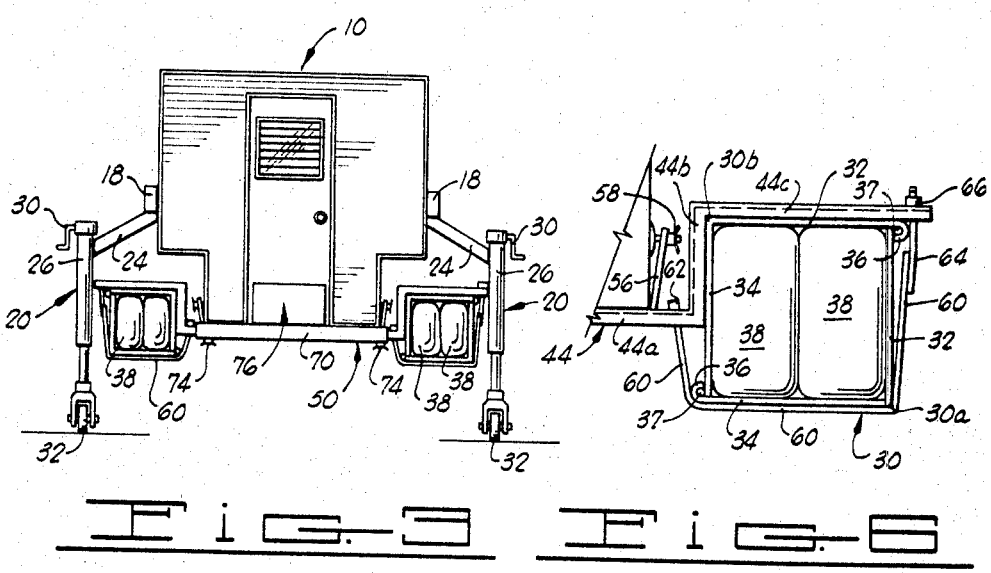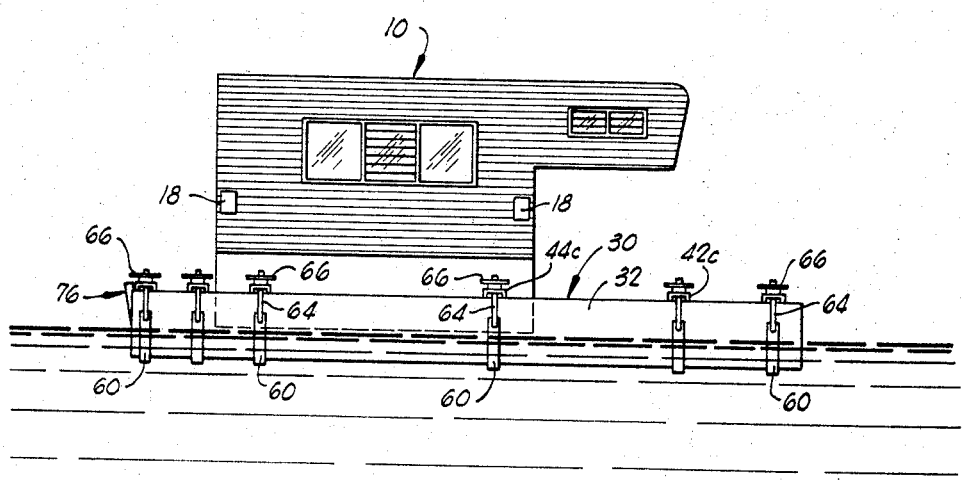

INVENTORS
JAMES A. MARTIN &
ALBERT D. DELOZIER
BY
ATTORNEYS

United States Patent Office 3,414,916
Patented Dec. 10, 1968

3,414,916
AMPHIBIOUS CAMPER APPARATUS
James A. Martin, P.O. Box 21, Wellston, Okla. 74881, and Albert D. De Lozier, P.O. Box 235, Nicoma Park, Okla. 73066
Filed Nov. 29, 1967, Ser. No. 686,511
9 Claims. (Cl. 9—1)

ABSTRACT OF THE DISCLOSURE

A camper apparatus which can be mounted on, and transported by, a truck, or which can alternatively be manually demounted from the truck and rigged with pontoons for aquatic travel. The dual pontoons employed for adapting the camper to aquatic use each include a pair of mating pontoon housing segments which each define an angle of about 90°, which segments are detachably interconnected to form an elongated, hollow, open ended pontoon housing of rectangular cross section. The two pontoon housings are secured on opposite sides of the camper body by straps passed beneath the body of the camper, and an elongated, flexible, inflatable flotation element is located in each pontoon housing in an inflated condition when the camper is afloat. The pontoon housing segments and flotation elements, when disassembled, can be stored compactly in a nested condition so that they require little space, and can be easily transported in or on the camper when it is mounted on the truck. Manually operable outrigger jacks are provided for loading and off-loading the camper from the truck.

BACKGROUND OF THE INVENTION

Field of the invention

This invention relates to camper structures of the type adapted to be supported on the bed of a truck for transport. More particularly, the invention relates to a camper structure which can be rigged for aquatic travel after it is demounted from a truck.

Brief description of the prior art

With a very substantial, recent increase in the extent of indulgence in leisure time activities which involve outdoor recreation, and particularly camping and traveling, a corresponding increase has occurred in the design and development of portable housing structures of the type now termed campers. In general, these structures are adapted to be transported from one location to another by means of some sort of vehicle which the outdoorsman already owns, such as a passenger car or pickup truck, and represent a compromise between the expense and corresponding luxury involved in owning and using a house trailer, and the economy and somewhat lesser convenience entailed in using a tent for camping purposes.

As the art of camper design and construction has developed, various proposals for improvement of these structures have been advanced. Some of these have been concerned with the ease with which truck-mounted campers can be loaded on, and removed from, small trucks. More recently, proposals have been advanced, and in a few instances, patented, which undertake to improve the versatility and usefulness of the camper structures by making them capable of aquatic usage. In general, this innovation has envisioned the use of some type of pontoon or flotation structure which is attached to the camper body to permit it to become water-borne. A difficulty not yet satisfactorily overcome, however, and which has prevented these designs from enjoying any widespread commercial success, is the problem of spatial accommodations of the pontoons or flotation gear when they are not in use. Since space is a major concern in almost all camper designs, sacrifice of the versatility afforded by the inclusion of bulky pontoons or flotation gear has been chosen, rather than acceptance of the inconvenience and discomfort entailed in their storage and transport when not in use.

Brief description of the present invention

The present invention provides amphibious camper apparatus which is capable of either land or aquatic transport, and which may be easily converted in structural configuration from one mode of use to the other. Broadly described, the apparatus comprises a camper housing or body; a plurality of elongated, pontoon-supporting members extended beneath the housing and detachably secured thereto; and a pair of pontoons connected to the opposite ends of the supporting members on opposite sides of the housing. The pontoons each include a segmented pontoon housing made up of two detachably connected housing segments which are each formed as two elongated plates extending at substantially a right angle to each other where they are joined along one longitudinal edge. The two segments, when connected to each other, form an elongated, hollow, open ended pontoon housing of substantially square or rectangular configuration. Each of the pontoons further includes a collapsible, inflatable flotation element which, when inflated, is frictionally retained in the hollow pontoon housing, and when deflated and collapsed can be easily removed from either of the open ends of the pontoon housing. The geometric configuration and the dimensions of the two pontoon structures are such that when the pontoons are disassembled, the several pontoons thereof can be stored compactly in a relatively small space, and may be conveniently transported on top of the camper housing if desired.

In addition to the described structure, the camper body is provided with a plurality of sockets on the opposite sides thereof. A plurality of outrigger jacks are engageable with the sockets, and when engaged, extend downwardly into contact with the ground. Each jack carries a wheel or roller at its lower end which is preferably detachable from the remainder of the jack. The jacks are preferably manually operated, and when employed, permit the camper body to be demounted from the truck and moved to a location in shallow water where the pontoons can be attached.

From the foregoing description of the invention, it will be apparent that it is an important object of the invention to provide an improved, easily used amphibious camper structure.

Another object of the invention is to provide pontoons for floating a camper, which pontoons can be disassembled and stored in a compact condition so as to occupy relatively little space.

Another object of the invention is to provide an amphibious camper apparatus which can be mounted for transport on a pickup truck, can be manually demounted from the truck, and can be rigged by a single person with pontoons for aquatic travel.

Yet another object of the invention is to provide an amphibious camper structure which is mechanically strong, and is characterized in having a long and trouble-free service life.

Additional objects and advantages of the invention will become apparent as the following detailed description of the invention is read in conjunction with the accompanying drawings which illustrate the invention.

BRIEF DESCRIPTION OF THE DRAWINGS

FIGURE 3 is a rear elevational view of the camper assembly depicted in FIGURE 2.

FIGURE 4 is a side elevational view of the camper as it appears when floated in the water by means of the pontoon structures forming a portion of the invention.

FIGURE 6 is a detail view depicting the appearance of a portion of one of the straps and pontoons used in the camper assembly of the invention.

DETAILED DESCRIPTION OF A PREFERRED EMBODIMENT OF THE INVENTION

Figure 1:
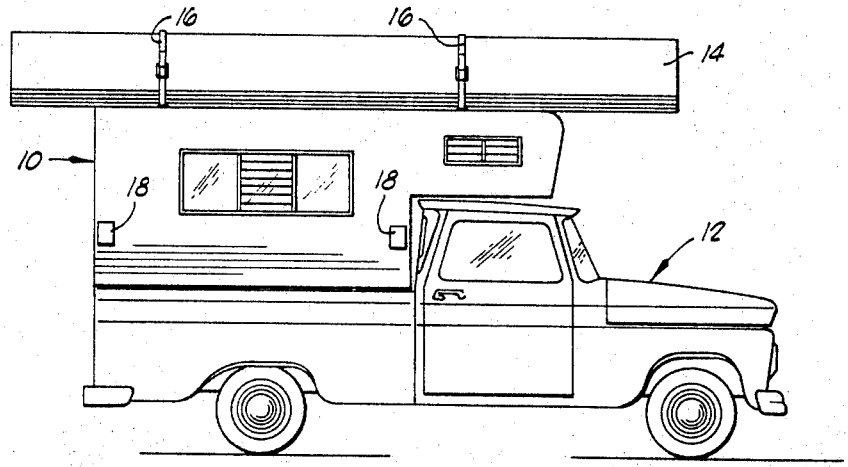
FIGURE 1 is a view in elevation of a camper body of the type which may be utilized in one embodiment of the present invention as the body appears when mounted on a pickup truck, with the pontoons which are used in combination with the camper body positioned on top of the body.

Referring initially to FIGURE 1 of the drawings, a typical camper body which may be utilized as a portion of the amphibious camper assembly of the present invention is designated generally by reference numeral 10 and is depicted as mounted upon the bed of a pickup truck 12. The substructures which are utilized in assembling a pair of pontoons which are secured to the camper body 10 as hereinafter described are stored on top of the camper body 10 and, as depicted in FIGURE 1, one of the pontoon housing segments 14 is visible. The substructures are stored on top of the camper body 10 by means of a plurality of flexible straps 16 which act as tie bands or holding elements for retaining these substructures in position as more particularly hereinafter described. Secured to each side of the camper body 10 adjacent the forward and rear ends thereof in an accessible location are a plurality of jack sockets 18, four being employed in the illustrated embodiment of the invention.

Figure 2:
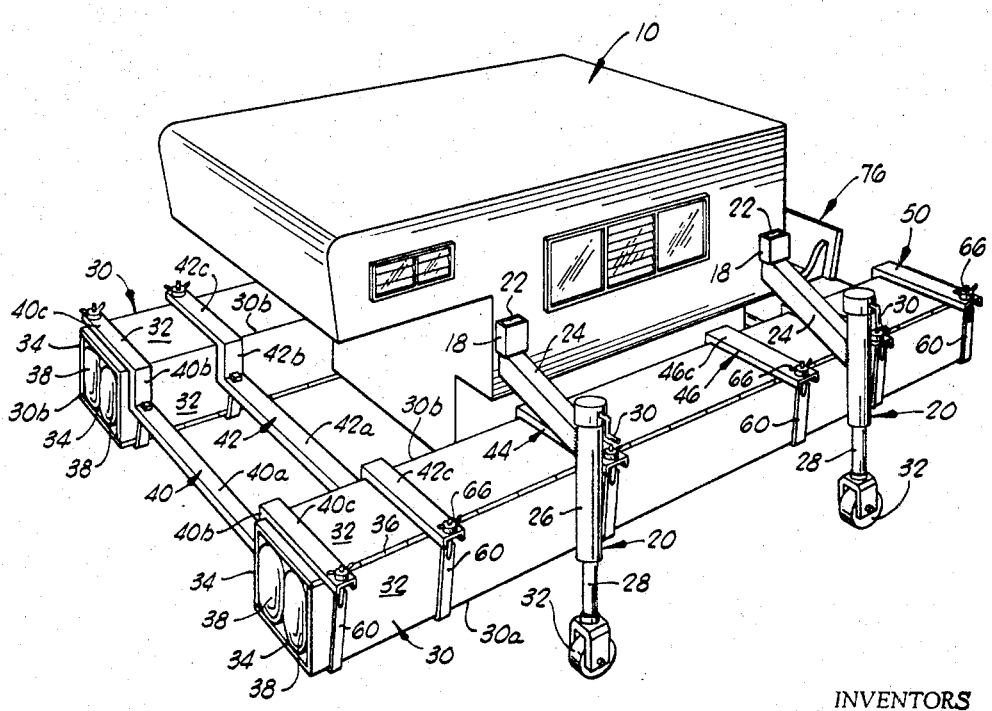
FIGURE 2 is a perspective view of the camper as it appears when the outrigger jacks utilized for off-loading the camper body from the truck are in position, and after the pontoons have been secured in position on opposite sides of the camper body.
Figure 5:
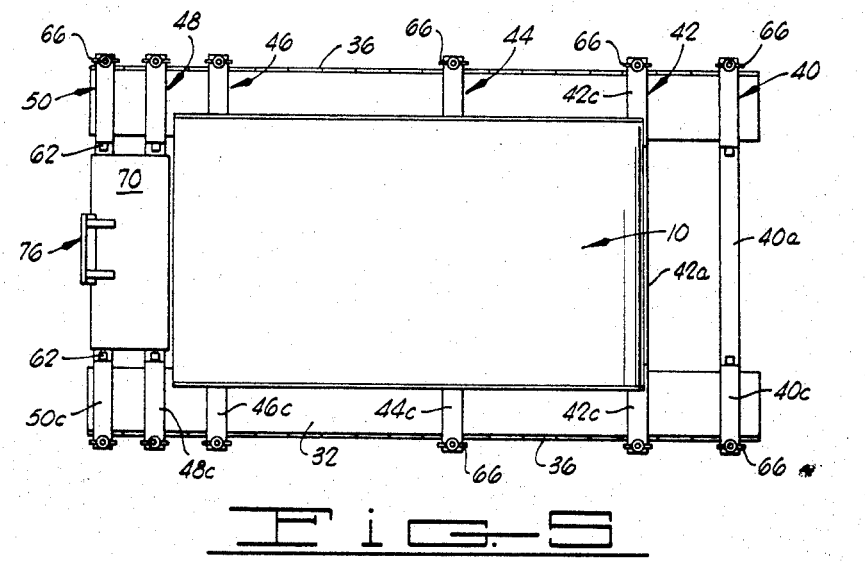
FIGURE 5 is a plan view of the camper body with pontoons secured to opposite sides thereof.

In FIGURE 2, the amphibious camper assembly is depicted as it appears following the off-loading of the camper body 10 from the pickup truck 12 by the use of a plurality of manually operated outrigger jacks, and also after the pontoon structures hereinafter described have been attached to the camper body. The jacks, designated generally by reference numeral 20, each include a socket engaging upper end portion 22, an angled supporting arm 24, a vertically extending barrel 26, and an externally threaded extensible shaft 28 which can be extended from the barrel 26 by rotation of a crank handle 30. At its lower end, each externally threaded extensible shaft 28 carries a caster or roller 32 which is preferably detachably and swivelly mounted on the lower end of the externally threaded extensible shaft. It will be noted that the barrel 26 and shaft 28 of each jack 20 is horizontally offset from the socket engaging portion 22 so that the lower portions of the jacks will clear the sides of the pickup truck 12 when the jacks are engaged with the sockets in the manner depicted in FIGURE 2.

Each of the pontoon structures used for rigging the camper for aquatic travel is designated generally by reference numeral 30 and is depicted in assembled, operative form in FIGURE 2. Each of the pontoon structures includes a pair of pontoon housing segments 30a and 30b which are each formed of two elongated plates 32 and 34 secured to each other along longitudinal edges at a right angle. In the case of each of the segments 30a and 30b, the free edge of the elongated plate 32, and also the free edge of the elongated plate 34 carry a plurality of sleeves or knuckles 36, with the knuckles or sleeves on the two segments mating and interfitting with each other when the segments are interconnected to form an elongated hollow pontoon housing having a rectangular cross section as depicted in FIGURE 6. For the purpose of securing the segments 30a and 30b to each other, elongated hinge pins 37 (see FIGURE 6) are extended through the interfitting knuckles 36 to form a piano-type hinge connecting the two pontoon housing segments to each other in the square or rectangular configuration illustrated. The elongated hinge pins are removed from the knuckles 36 when the pontoon housings are to be disassembled for storage or transportation as hereinafter described. It should also be pointed out that an alternate form of pontoon construction which can be utilized is to use four plates interconnected by four piano-type hinges, rather than the two L-shaped housing segments 30a and 30b which are depicted. For maximum versatility in storage, it is also sometimes desirable to divide the elongated plates 32 and 34 into equilength segments and to interconnect these parts by a transversely extending hinge structure when the pontoons are assembled.

To attain the necessary buoyancy to support the camper on the surface of the water, a plurality of elongated, flexible flotation elements 38 are positioned in each of the assembled pontoon housings, and may be inflated with air or other suitable gaseous material so that the flotation elements are ballooned outwardly to frictionally engage the internal surfaces of the pontoon housing segments 30a and 30b. This status of the flotation elements 38 is depicted in FIGURES 2 and 6. When the flotation elements 38 are deflated, they collapse to a flattened state and can be easily removed from either of the open ends of the pontoon housings.

Figure 7:
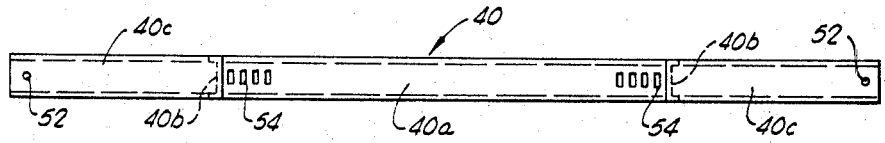
FIGURE 7 is a plan view of one of the straps used to secure the pontoons to opposite sides of the camper body.

For the purpose of securing the pontoons 30 on opposite sides of the body 10 of the camper, a plurality of elongated straps designated generally by reference numerals 40, 42, 44, 46, 48 and 50 are utilized. Each of the straps 40–50 includes an elongated central section 40a–50a, respectively, a pair of upwardly turned portions 40b–50b, respectively, located at opposite ends of each of the elongated central sections, and a pair of outwardly directed pontoon-retaining flanges designated by reference numerals 40c through 50c, respectively. The manner in which the straps 40–50 are used to secure the pontoons on opposite sides of the camper body 10 is best depicted in FIGURES 2–6, and the details of construction of each individual strap are best depicted in FIGURE 7. In referring to FIGURE 7, it will be noted that the strap 40, which is there depicted as typical of each of straps 40–50, has a pair of apertures 52 formed adjacent the free end of each of the outwardly directed pontoon retaining flanges 40c thereof. At the opposed ends of the elongated central sections 40a and adjacent the upwardly turned portions 40b, the strap 40 carries a plurality of spaced slots 54.

On rigging the camper body 10 for aquatic use, a plurality of the straps, such as straps 44 and 46, are positioned with their elongated central sections 44a and 46a extending under the camper body as best depicted in FIGURES 3, 4 and 6. The camper body 10 thus rests upon, and is supported by these elongated central portions 44a and 46a of the straps 44 and 46. With the centrally located straps 44 and 46 positioned beneath the camper body 10 in this manner, the straps are secured in this position by the use of a pair of bias plates 56 which each carry at one end thereof a threaded pusher bolt 58 which can be screwed varying distances through the respective bias plate to push against the lower portion of the side of the camper body 10 and thus frictionally wedge the lower end of respective bias plate in one of the slots 54. This structural arrangement permits the straps 40–50 to be accommodated to campers of various sizes.

The assembled pontoons 30 are then positioned in the angle formed between the outwardly directed pontoon retaining flanges 44c and 46c and the upwardly turned portions 44b and 46b of the straps 44 and 46 as best depicted in FIGURE 6. An elongated flexible band 60 which has an enlarged stop member 62 on one end thereof is extended downwardly through one of the slots 54 provided in the elongated central sections 44a and 46a of the straps 44 and 46 and is then pulled tightly around the lower portion of the pontoon housing. Threaded bolts 64 secured to the opposite ends of the bands 60 from the respective stop members 62 are passed through the apertures 52 disposed in the outermost end of the outwardly directed pontoon retaining flanges 44c and 46c of the respective straps. A wing nut 66 is threaded upon each bolt 64 and is used to tension the flexible band 60 tightly around the lower portion of each of the pontoons 30.

In a preferred embodiment of the invention, a plurality of the straps are also used for interconnecting those portions of the pontoons 30 which project fore and aft of the camper body 10. Thus, as depicted in FIGURES 2 and 4, the straps 48 and 50 are connected to the pontoons 30 in the same manner as has been described with respect to the pontoons 44 and 46, and are positioned abaft or to the rear of the camper body 10. The pair of straps 40 and 42, on the other hand, extend between and interconnect the pontoons 30 at a position ahead of the camper body 10. In addition to their function of lending structural strength to the assembly, and spacing and securing the pontoons 30 with respect to each other, the after straps 48 and 50 have been utilized in the preferred embodiment of the invention illustrated in the drawings for the purpose of supporting a deck plate 70. The deck plate 70 is secured to the straps 48 and 50 in a manner best illustrated in FIGURES 3, 5 and 8. Thus, the deck plate 70 preferably carries flanges along the longitudinal edges thereof which define C-shaped channels 72. The channels 72 are dimensioned to extend over and engage the elongated central sections 48a and 50a of the straps 48 and 50. A pair of threaded clamps 74 are threaded through the lower flange of the deck plate 70, and thus assure its securement to the straps 48 and 50. Preferably, the deck plate 70 carries a transom structure designated generally by reference numeral 76 which will permit an outboard motor to be secured to the vertical plate portion of the transom for supplying a propulsive force to the camper when it is water borne. It should be noted that in many instances, it will be desirable to secure a generally similar deck plate to the straps which are utilized forward of the camper body 10 for interconnecting the pontoons 30. This arrangement will then provide an open deck forward of the camper body which can be utilized to advantage for a number of purposes.

Figures 8, 9:
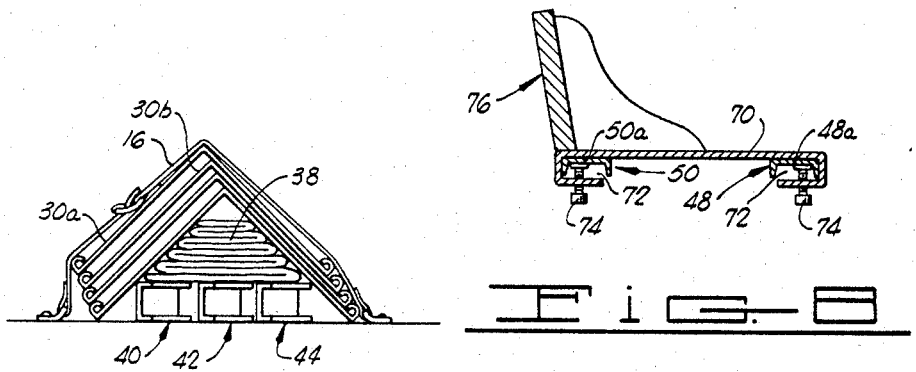
FIGURE 8 is a sectional view taken along line 8—8 of FIGURE 5.
FIGURE 9 is an end elevation view of the nested substructures used in the two pontoon assemblies forming a portion of the invention, when such substructures are shown stored for transport.

When the pontoons 30 are disassembled, and the camper body 10 is mounted on the truck 12 for transport in the manner depicted in FIGURE 1, the various structural elements of the pontoons 30 can be very compactly stored in a small place, and a preferred storage arrangement and location of these elements during transport of the camper on the land vehicle are depicted in FIGURES 1 and 9. In disassembling the camper assembly, the pontoons 30 are first disconnected from the camper body 10 by removing the bands 60 from around the pontoons, and then disengaging the straps from the pontoons and from the lower side of the camper body. The flotation elements 38 are then deflated and collapsed and can be removed from either of the open ends of the pontoon housings. The pontoon housings are then each disassembled by removing the pair of hinge pins 37 used in each housing for interconnecting the pontoon housing segments 30a and 30b to each other. The housing segments 30a and 30b can then be stored in nested form on top of the camper body 10 as depicted in FIGURES 1 and 9.

The straps can be placed inside of or beneath the inverted pontoon housing segments, along with the deflated flotation elements 38. A plurality of flexible tie members 80 can then be extended around the nested pontoon housing segments 30a and 30b and tensioned to retain the stored elements of the pontoons in a compact position on top of the camper body 10.

From the foregoing description of the invention, it will have become apparent that the present invention provides an improved, highly versatile amphibious camper apparatus which can be utilized while carried on the bed of a truck for portability over the land, or can also be utilized for water travel when a pair of easily disassembled and assembled pontoon structures are secured to opposite sides of the camper body. At such time as it is desired to convert a camper from land utilization to aquatic use, the outrigger jacks 20 are positioned as depicted in FIGURES 2 and 3, and the camper body is elevated by turning the handles 30 of the jacks to extend the externally threaded extensible shaft 28 of each jack and thereby force the camper upwardly relative to the ground. The truck 12 can then be driven from beneath the camper, and the camper can be rolled on the jacks to a position over the water or, alternately, the pontoons 30 can be secured in position on opposite sides on the camper before it is moved on the jacks to the proximity of the water.

A single person can connect the outrigger jacks 20 to the camper body 10 and remove it from the bed of the truck 12. It is also relatively easy for a single person to remove the disassembled elements of the pontoons 30 from the top of the camper body 10 and assemble these elements in the manner depicted in the various figures of the drawing and secure them on opposite sides of the camper body. Thus, the pairs of pontoon housing segments 30a and 30b are interconnected by means of the hinge pins 37 to form the rectangular cross sectioned pontoon housings, and these housings can then be utilized to receive the deflated flotation elements 38. The flotation elements 38 can then be inflated with air, $CO_2$, or any suitable light gaseous material and, when inflated, will afford the buoyancy necessary to float the camper in the position depicted in FIGURE 4.

In many instances, the inclination or grade of the bank of the stream will be sufficiently steep that it may be desirable to connect a rope, cable or similar elongated flexible member between the camper body 10 and the vehicle 12 in order to control movement of the camper on the jacks 20 into the water. It may also be desirable in many instances to remove the camper from the water by this means prior to detaching the pontoons from the camper body. It is well within the skill of the average sportsman, however, to ascertain the best mode of moving the camper body 10 on the jacks 20 into the water, and of securing the pontoons 30 on opposite sides of the camper by means of the straps 40–50.

What is claimed is:
1. An amphibious camper apparatus comprising:
   a camper body;
   a plurality of elongated, pontoon supporting members extended beneath the camper body and projecting on the opposite sides thereof, said supporting members being detachably secured to said camper body;
   a pair of pontoons detachably connected to the opposite ends of the supporting members on opposite sides of the camper body, said pontoons each including
   a plurality of segments detachably interconnected to each other to form a hollow housing open at at least one end thereof; and
   a flexible, inflatable flotation member in said hollow housing.

2. An amphibious camper apparatus as defined in claim 1 and further characterized to include
   a plurality of jack sockets on said camper body; and
   a jack detachably engaged with each of said sockets, each of said jacks having a socket engaging upper end portion and a lower end portion which is horizontally offset from said upper end portion.

3. An amphibious camper apparatus as defined in claim 1 wherein each of said supporting members comprises a strap having
   an elongated central section positioned under said camper body;
   a pair of upwardly turned portions located at opposite ends of said elongated central sections; and
   an outwardly directed pontoon-retaining flange extending from the upper end of each of said upwardly turned portions in the opposite direction from said central section, and substantially parallel thereto, each of said outwardly directed pontoon-retaining flanges extending across one of said pontoons.

4. An amphibius camper apparatus as defined in claim 1 wherein there are two substantially identical segments in each of said pontoons and said segments each include two elongated plates joined to each other along one longitudinal edge and having hinge knuckles along the other longitudinal edge;
   and further characterized to include an elongated hinge pin extending through the aligned, interfitted knuckles of the pair of segments of each pontoon to detachably engage said segments with each other.

5. An amphibious camper as defined in claim 2 wherein each of said jacks includes:
   a vertically extending barrel constituting said offset lower end portion;
   an angled supporting arm interconnecting said upper end portion and said barrel;
   an extensible shaft movably engaged with said barrel; and
   crank means for extending said shaft relative to said barrel.

6. An amphibious camper apparatus as defined in claim 1 wherein each of said straps is further characterized to include a plurality of spaced slots adjacent opposite ends of said central section and an aperture in each of said outwardly directed pontoon-retaining flanges;
   and wherein said camper apparatus further includes:
   elongated bands extended around each of said pontoons on the opposite side thereof from each of said outwardly-directed pontoon-retaining flanges, each of said bands having one end portion extending through one of said slots;
   an enlarged stop member secured to the end of each of said bands which is extended through one of said slots;
   a threaded bolt secured to the opposite end of each of said bands from the end theerof which is extended through one of said slots, said threaded bolts each extending through the nearest adjacent one of said apertures; and
   a nut threaded on each of said threaded bolts.

7. An amphibious camper apparatus as defined in claim 6 and further characterized to include:
   pairs of bias plates on opposite sides of the camper body and with each of said plates in each pair having one end projecting through one of the slots in one of said straps; and
   a threaded pusher bolt threaded through each bias plate and contacting an adjacent side of the camper body.

8. An amphibious camper apparatus as defined in claim 3 and further characterized to include
   an additional plurality of said straps extending between and supported by said pontoons and spaced horizontally from each other and from the rear of said camper body;
   a deck plate secured across, and supported by, said additional plurality of pontoons.

9. An amphibious camper apparatus as defined in claim 8 and further characterized to include a vertically extending transom secured to said deck plate and facilitating attachment of an outboard motor to said camper apparatus.

References Cited

UNITED STATES PATENTS

| | | | |
|---|---|---|---|
| 3,091,208 | 5/1963 | Copeland et al. | 115—1 |
| 3,335,437 | 8/1967 | Judkins | 9—1 |

MILTON BUCHLER, *Primary Examiner.*

T. M. BLIX, *Assistant Examiner.*

U.S. Cl. X.R.

296—23